United States Patent
Shrestha et al.

(10) Patent No.: US 12,531,241 B2
(45) Date of Patent: Jan. 20, 2026

(54) METHOD FOR MAKING LITHIUM METAL PHOSPHATES

(71) Applicant: VSPC PTY LTD, Kew (AU)

(72) Inventors: Aabhash Shrestha, Wacol (AU); John Worsley, Wacol (AU)

(73) Assignee: VSPC PTY LTD, West Perth (AU)

( * ) Notice: Subject to any disclaimer, the term of this patent is extended or adjusted under 35 U.S.C. 154(b) by 1 day.

(21) Appl. No.: 18/009,244

(22) PCT Filed: Jun. 8, 2021

(86) PCT No.: PCT/AU2021/050572
§ 371 (c)(1),
(2) Date: Dec. 8, 2022

(87) PCT Pub. No.: WO2021/248181
PCT Pub. Date: Dec. 16, 2021

(65) Prior Publication Data
US 2023/0223533 A1    Jul. 13, 2023

(30) Foreign Application Priority Data
Jun. 9, 2020    (AU) .................. 2020203801

(51) Int. Cl.
| | | |
|---|---|---|
| *H01M 4/58* | (2010.01) | |
| *C01B 25/45* | (2006.01) | |
| *H01M 4/36* | (2006.01) | |
| *H01M 4/587* | (2010.01) | |
| *H01M 4/02* | (2006.01) | |

(52) U.S. Cl.
CPC ........... *H01M 4/5825* (2013.01); *C01B 25/45* (2013.01); *H01M 4/366* (2013.01); *H01M 4/587* (2013.01); *C01P 2002/52* (2013.01); *C01P 2004/50* (2013.01); *C01P 2004/62* (2013.01); *C01P 2004/64* (2013.01); *C01P 2004/80* (2013.01); *C01P 2006/40* (2013.01); *H01M 2004/021* (2013.01)

(58) Field of Classification Search
CPC .................................................. H01M 4/5825
See application file for complete search history.

(56) References Cited

U.S. PATENT DOCUMENTS

| | | |
|---|---|---|
| 2015/0188139 A1 | 7/2015 | Kitagawa et al. |
| 2016/0322630 A1 | 11/2016 | Oyama et al. |
| 2019/0020015 A1 | 1/2019 | Huang et al. |

FOREIGN PATENT DOCUMENTS

| | | | | |
|---|---|---|---|---|
| CN | 102275887 A | | 12/2011 | |
| CN | 102593447 A | * | 7/2012 | ............... H01M 4/58 |
| CN | 103000892 A | * | 3/2013 | ............... C01B 25/45 |
| EP | 2884568 A1 | * | 6/2015 | ............... H01M 4/36 |
| JP | 2013-032257 A | | 2/2013 | |
| JP | 2013/049583 A | | 3/2013 | |
| TW | 201221468 A | * | 6/2012 | ............... C01B 25/45 |
| WO | 2020/012970 A1 | | 1/2020 | |

OTHER PUBLICATIONS

Chen, G. et al., "Improving the Performance of Lithium Manganese Phosphate Through Divalent Cation Substitution", Electrochemical and Solid-State Letters, 2008, vol. 11 (No. 11, pp. A190-A194.
Fang, H. et al., "Rate Performance of LiMnPO4 Based Materials from Different Carbon Source Addition Process", Int. J. Electrochem. Sci., 2012, vol. 7, pp. 11827-11833.
Zhang, Y. et al., "Improving the Rate Capability of LiFePO4 Electrode by Controlling Particle Size Distribution", J. Electrochem. Soc., 2019, vol. 166, No. 16, pp. A4128-A4135.
International Search Report and Written Opinion of the ISA issued in PCT/AU2021/050572, mailed Aug. 31, 2021, ISA/AU.
Korean Office Action for Application No. 10-2023-7000893 issued on Aug. 19, 2025.

* cited by examiner

*Primary Examiner* — Khanh T Nguyen
(74) *Attorney, Agent, or Firm* — Harness, Dickey & Pierce, P.L.C.

(57) ABSTRACT

A method for making a material of formula $Li_xM_{1-z}D_zPO_4$, where M is one or more transition metals, D represents one or more elements selected from the group consisting of Mg, Ca, Sr, Ba, Ti, Zn, B, Al, Ga, In, Si, Ge, Sc, Y, and rare earth elements, $0.8 \leq x \leq 1.2$ and $0 \leq z \leq 0.2$, the method comprising the steps of: a) forming a mixture comprising a source of the one or more transition metals, a source of phosphorus, a source of lithium and a surfactant, and optionally a source of D, wherein (i) a ratio of $Li:PO_4:(M+D)$ relative to the stoichiometry required to form the material is within the range of 1.04-1.10:1.00-1.05:1, or (ii) a ratio of $(Li+PO_4):(M+D)$ relative to the stoichiometry required to form the material is greater than 2.05; b) drying the mixture from step (a) to form particles or a powder; and c) thermally treating the particles or powder from step (b) to form the material.

19 Claims, No Drawings

METHOD FOR MAKING LITHIUM METAL PHOSPHATES

TECHNICAL FIELD

The present invention relates to a method for making lithium metal phosphates.

BACKGROUND ART

Lithium metal phosphates, such as lithium iron phosphate, are widely used in the manufacture of lithium ion batteries due to its high energy density good stability, ability to withstand a large number of charge/discharge cycles and relatively low-cost.

It will be clearly understood that, if a prior art publication is referred to herein, this reference does not constitute an admission that the publication forms part of the common general knowledge in the art in Australia or in any other country.

SUMMARY OF INVENTION

In one aspect, the present invention is directed to a method for making a material of formula $Li_xM_{1-z}D_zPO_4$, where M is one or more transition metals, D represents one or more elements selected from the group consisting of Mg, Ca, Sr, Ba, Ti, Zn, B, Al, Ga, In, Si, Ge, Sc, Y, and rare earth elements, $0.8 \leq x \leq 1.2$ and $0 \leq z \leq 0.2$, the method comprising the steps of:
  a) forming a mixture comprising a source of the one or more transition metals, a source of phosphorus, a source of lithium and a surfactant, and optionally a source of D, the mixture, wherein (i) a ratio of Li:PO4:(M+D) relative to the stoichiometry required to form the material is within the range of 1.04-1.10:1.00-1.05:1, or (ii) a ratio of (Li+PO4):(M+D) relative to the stoichiometry required to form the material is greater than 2.05;
  b) drying the mixture from step (a) to form particles or a powder; and
  c) thermally treating the particles or powder from step (b) to form the material.

In one embodiment, M is one or more transition metals selected from Fe, Mn, Ni, Co, Cr or V. In one embodiment, M is Fe. In one embodiment, M comprises Fe and one or more of Mn, Ni, Co, Cr or V. In one embodiment, M comprises 2 or more of Fe, Mn, Ni, Co, Cr or V.

In one embodiment, the process further comprises the steps of:
  d) mixing the material from step (c) with a liquid containing a carbon precursor,
  e) spray drying the mixture from step (d) to form particles of the material coated with the carbon precursor, and
  f) converting the carbon precursor to carbon.

In one embodiment, the mixture formed in step (a) includes a liquid. In one embodiment, the liquid comprises water. In one embodiment, the liquid comprises demineralised water or deionised water.

In one embodiment, the mixture formed in step (a) comprises a solution in which the source of one or more transition metals, the source of phosphorus and the source of lithium are dissolved, and the source of D, if present, are dissolved.

In another embodiment, the mixture formed in step (a) comprises a slurry in which one or more of the source of one or more transition metals, the source of phosphorus or the source of lithium, or the source of D, if present, is present as particulate material. In one embodiment, the source of one or more transition metals is present as particulate material. In this embodiment, the particulate material remains as or persists as particulate material during the mixing and drying step. In one embodiment, the source of one or more transition metals is a source of iron and the source of iron is present as particulate material in the mixture. Prior art methods known to the present inventors for forming lithium metal phosphates typically involve forming a solution in which all precursor compounds are dissolved. Some of the precursor compounds can be difficult to dissolve and/or forming the solution may require additional reactants or additional processing steps. As a result, the present inventors believe that processes in accordance with the present invention in which the mixture of step (a) comprises a slurry are particularly advantageous as they can result in one or more of reduced processing steps, less reactants or simple processing.

In embodiments where one or more of the source of one or more transition metals, the source of phosphorus or the source of lithium, or the source of D, if present, is present as particulate material, the particulate material or the slurry may be milled prior to drying. In one embodiment, the particulate material or slurry is milled in a bead mill or a rotating mill. Other milling processes may be used. The milling step may reduce the size of the particulate material and intimately and homogeneously mix the particulate material with the other components of the slurry.

In one embodiment, the source of one or more transition metals comprises a source of one or more of Fe, Mn, Ni, Co, Cr or V. In one embodiment, the source of one or more transition metals comprises one or more compounds containing the transition metal(s). This may include M+2 salts, such as chloride and sulphate salts, M+3 salts, such as chloride salts, nitrate salts, sulphate salts, organic M salts, such as M-oxalate, M-citrate, M-phosphates, M-oxides, metallic M or other M-containing compounds.

In one embodiment, the source of one or more transition metals comprises a source of iron. In this embodiment, the source of iron may comprise an iron containing compound. Any suitable iron containing compound can be used, although it is desirable that the iron containing compound has iron in the form of iron (II). Iron (II) oxalate dihydrate is one example of a suitable iron containing compound. The source of iron can be mineral Fe+2 salts (e.g. $FeCl_2$, $FeSO_4$ etc), mineral Fe+3 salts (e.g. $FeCl_3$, $Fe(NO_3)_3$, $Fe_2(SO_4)_3$ etc), organic Fe salts (e.g. Fe oxalate, Fe citrate etc), Fe phosphates (e.g. $FePO_4$, $Fe_3(PO_4)_2$), Fe oxides (e.g. magnetite, haematite etc), metallic Fe or other Fe containing compounds.

In one embodiment, the source of phosphorus comprises a phosphorus containing compound or a phosphorus containing acid. In one embodiment, the source of phosphorus comprises phosphoric acid. The source of phosphorus may be phosphoric acid, lithium containing phosphates (e.g. $Li_3PO_4$, $Li_2HPO_4$, $LiH_2PO_4$), organic phosphates (e.g. $(NH_4)_3PO_4$, $(NH_4)_2HPO_4$, $NH_4H_2PO_4$) or other phosphate containing compounds.

The source of lithium may be carbonates (e.g. $Li_2CO_3$, $LiHCO_3$), phosphates (e.g. $Li_3PO_4$, $Li_2HPO_4$, $LiH_2PO_4$), hydroxides (e.g. LiOH), mineral lithium salts (e.g. LiCl, $LiNO_3$, $Li_2SO_4$ etc), organic mineral salts (e.g. Li acetates, lithium oxalates etc), metallic Li or other lithium containing compounds. In one embodiment, the source of lithium comprises lithium carbonate.

In one embodiment, the source of D may comprise one or more water soluble compounds containing D or one or more water insoluble compounds (including oxides) containing D, or mixtures thereof.

The inventors have surprisingly found that better performing material, such as $LiMPO_4$, is obtained where the amount of Li is greater than a stoichiometric amount, the amount of $PO_4$ is greater than a stoichiometric amount but less than the amount of Li, where Li and $PO_4$ quantities are stated relative to the amount of M or M+D. In other words, the ratio of each of Li, $PO_4$ and M or M+D in the mixture, when expressed as a ratio of the stoichiometric amount is such that the input ratios are Li>$PO_4$>M (or M+D). For example, Li may be present as about 1.04-1.10 of the stoichiometric amount, $PO_4$ may be present as about 1.00-1.05 of the stoichiometric amount and M (or M and D) may be present as about 1.00 the stoichiometric amount. $PO_4$ in this context also refers to $PO_4$ precursors. In one embodiment, the ratio of each of Li, $PO_4$ and M (or M and D) in the mixture, when expressed as a ratio of the stoichoimetric amount, is such that the input ratios are Li>$PO_4$>M, or Li is present as about 1.05 the stoichiometric amount, $PO_4$ is present as about 1.02 the stoichiometric amount and M (or M and N) is present as about 1.00 the stoichiometric amount.

In one embodiment, the ratio of Li:PO4:(M+D) relative to the stoichiometry required to form the material is within the range of 1.05-1.09:1.00-1.04:1. In one embodiment, the ratio of each of Li, $PO_4$ and M (or M and D) in the mixture, when expressed as a ratio of the stoichiometric amount, is such that the input ratios are Li>$PO_4$>M, or Li is present as about 1.07 the stoichiometric amount, $PO_4$ is present as about 1.02 the stoichiometric amount and M (or M and D) is present as about 1.00 the stoichiometric amount. In one embodiment, the ratio of each of Li, $PO_4$ and M (or M and D) in the mixture, when expressed as a ratio of the stoichiometric amount, is such that the input ratios are Li>$PO_4$>M, or Li is present as about 1.05 the stoichiometric amount, $PO_4$ is present as about 1.02 the stoichiometric amount and M (or M and D) is present as about 1.00 the stoichiometric amount.

In other embodiments, a ratio of (Li+$PO_4$):(M+D) relative to the stoichiometry required to form the material is greater than 2.05, or even preferably in the range of from 2.07-2.13.

In one embodiment, the present invention comprises a method for making lithium metal phosphate of formula $LiMPO_4$, where M is one or more transition metals comprising the steps of:
a) forming a mixture comprising water, a source of the one or more transition metals, a source of phosphorus, a source of lithium and a surfactant, wherein the mixture formed in step (a) comprises a slurry in which one or more of the source of one or more transition metals, the source of phosphorus or the source of lithium is present as particulate material, and wherein the mixture has an amount of Li greater than a stoichiometric amount, an amount of $PO_4$ greater than a stoichiometric amount but less than the amount of Li, where Li and $PO_4$ quantities are stated relative to the amount of M;
b) spray drying the mixture from step (a) to form particles or a powder; and
c) thermally treating the particles or powder from step (b) to form lithium metal phosphate.

In one embodiment, the mixture of step (a) comprises a solution and the step of forming the solution comprises mixing a solvent or a reactant with water and particles of one or more of the source of iron, the source of phosphorus or the source of lithium to thereby dissolve the particles of one or more of the source of iron, the source of phosphorus or the source of lithium. In one embodiment, one or more of the source of iron, the source of phosphorus source of lithium is only sparingly soluble water. In one embodiment, the source of iron is only sparingly soluble in water and the solvent or reactant dissolves or reacts with the source of iron to thereby place iron into solution.

In one embodiment, the mixture formed in step (a) further includes oxalic acid and the mixture of step (a) comprises a solution formed by mixing water and oxalic acid and the source of iron with a solvent or reactant that dissolves or reacts with the oxalic acid and the source of iron to thereby solubilise the oxalic acid and the source of iron, adding the source of phosphorus and then adding the source of lithium to thereby form the solution. The surfactant may then be added to the solution to form the mixture of step (a) in liquid form.

In one embodiment, the mixture of step (a) comprises water present in amount from 25% to 75% by weight of the total weight of the mixture.

In one embodiment, the surfactant is present in an amount of from 0.05% to 10% by weight of the mixture, or from 1% to 4% by weight of the total mixture, or from about 1.4% to 2.8%.

In one embodiment, the source of one or more transition metals may comprise from 5% to 40% by weight of the mixture, or from 10% to 35% by weight of the mixture, or from 15% to 30% by weight of the mixture.

In one embodiment, the source of phosphorus is present in an amount of from 5% to 30% by weight of the mixture, or from 5% to 25% by weight of the mixture, or from 9% to 20% by weight of the mixture.

In one embodiment, the source of lithium is present in an amount of from 2% to 21% by weight of the mixture, or from 2% to 10% by weight of the mixture, or from 2.5% to 8% by weight of the mixture, or from about 3% to 7% by weight of the mixture.

If D is present, the source of D will typically be present in an amount commensurate with the requirements for the final composition of the material.

In embodiments where the mixture contains other ingredients, such as solvents and/or other reactants or other materials, the other ingredients may be present in an amount of from 15% to 35% by weight of the mixture, or from 17% to 30% by weight, or from 20% to 30% by weight of the mixture.

In one embodiment, the mixture of step (a) comprises a solution that has had water, iron (II) oxalate dihydrate, oxalic acid dihydrate, hydrogen peroxide, phosphoric acid and lithium carbonate added to it, and the surfactant added.

In one embodiment, the mixture of step (a) comprises a slurry containing particulate material. In one embodiment, the slurry comprises particles of iron (II) oxalate dihydrate, phosphoric acid, lithium carbonate, water and surfactant. In one embodiment, phosphoric acid is added to water and then lithium carbonate is added, which reacts/dissolves. Iron oxalate is then added to form the slurry and the slurry is then subjected to milling. Surfactant is added during or after milling. In one embodiment, the surfactant is added after milling. In another embodiment, the slurry may be made by mixing particles of iron (II) oxalate dihydrate with water in a grinding mill and milling, and adding lithium carbonate and phosphoric acid to the grinding mill to form a slurry, and then mixing the slurry with the surfactant to form the mixture.

The surfactant may comprise a non-ionic surfactant, an anionic surfactant or a cationic surfactant. In one embodiment, the surfactant comprises a non-ionic surfactant. In one embodiment, the surfactant comprises an ethoxylate surfactant or an alkoxylate surfactant. In one embodiment, the surfactant comprises an alcohol ethoxylate, or an ethoxylated lauryl alcohol surfactant. Other surfactants that could be used include Polyoxyethylene(4)lauryl ether, Octylphenol Ethoxylate and block copolymers based on ethylene/propylene oxide. Other surfactants may also be used, such as lipids.

Step (b) of the present invention involves drying the mixture from step (a). In one embodiment, step (b) comprises spray drying.

In one embodiment, the surfactant is added to form the mixture of step (a) in a tank prior to the dryer or spray dryer.

The spray dryer may be any spray dryer known to be suitable to a person skilled in the art. In one embodiment, the spray dryer comprises a rotating disk spray dryer or a disk atomiser.

In one embodiment, the inlet gas temperature to the dryer has a temperature of from 150° C. to 500° C., or from 175° C. to 350° C., and the dryer outlet gas has a temperature of from 50° C. to 150° C., or from 80° C. to 120° C.

The spray drying step produces a dry, free-flowing powder at high product recovery. The present inventors have found that including surfactant in the mixture that is spray dried in step (b) is essential as tests conducted without the surfactant produced a moist powder having poor product recovery due to accumulation of sticky powder in the drying chamber of the spray dryer. The present inventors have also used polyethylene glycol instead of surfactant and these tests produced unsatisfactory results.

In other embodiments, the dryer may comprise a fluidised bed dryer, a rotary dryer, a rolling bed dryer, a conduction dryer, a convection dryer, a toroidal bed dryer, a vacuum dryer or a dispersion dryer.

In some embodiments, the mixture of step (a) is dried in step (b) and the dried product may need to be broken up into smaller particles or a powder, such as by milling or vibrating.

The powder produced in step (b) is a precursor powder or precursor particulate material. This precursor powder/particulate material is then thermally treated to produce particles of the material. The material is represented by the formula $Li_xM_{1-z}D_zPO_4$, wherein x and z are as stated above in this specification. The thermal treatment of step (c) is suitably conducted in an oxygen free atmosphere, for example, in a nitrogen atmosphere or in an inert atmosphere. In some embodiments, step (c) may comprise passing the powder/particulate material from step (b) into an environment having a temperature of from 400 to 600° C., or from 450 to 500° C., or from 450 to 480° C. The powder/particulate material may be heated for sufficiently long to ensure essentially complete conversion to the material. In some embodiments, the powder/particulate material may be treated in a reactor or furnace for a period of from 5 minutes to 6 hours, or from 10 minutes to 3 hours, or from 20 minutes to 2 hours, or from 30 minutes to 1 hour, or for about 45 minutes.

In embodiments where one or more of the source of one or more transition metals, the source of phosphorus or the source of lithium, or the source of D, if present, is present as particulate material, the particulate material remains as particulate material after the drying or spray drying step and the particulate material then takes part in the reaction(s) that form the lithium metal phosphate.

The raw powder of the material formed in step (c) may comprise particles that are formed as agglomerates of crystallites. The crystallites may have a particle size in the range from 10 to 200 nm, or from 20 to 100 nm.

Preliminary testing conducted by the inventors has shown that the crystallites which form in step (c) may have a particle size distribution having a primary particle (or crystallite) size in the range from 10 to 200 nm, or from 20 to 100 nm and the agglomerates which form in step (c) have a particle size distribution having $d_{10}$ of from 1-10 µm, $d_{50}$ of from 5-50 µm and $d_{90}$ of from 10-100 µm.

In one embodiment, the present invention provides a method for making a material of formula $Li_xM_{1-z}D_zPO_4$, where M is one or more transition metals comprising the steps of:
  a) forming a mixture comprising a source of the one or more transition metals, a source of phosphorus, a source of lithium, optionally a source of D, and a surfactant, the mixture comprising a slurry and one or more of the source of one or more transition metals, the source of phosphorus or the source of lithium or the source of D, if present, is present as particulate material, wherein (i) a ratio of Li:$PO_4$:(M+D) relative to the stoichiometry required to form the material is within the range of 1.04-1.10:1.00-1.05:1, or (ii) a ratio of (Li+$PO_4$):(M+D) relative to the stoichiometry required to form the material is greater than 2.05;
  b) drying the mixture from step (a) to form a powder; and
  c) thermally treating the powder from step (b) to form the material.

In this embodiment, the particulate may persist in step (a) and step (b) and take part in the reactions(s) that form the material in step (c). In this embodiment, M, and D, and x, and z, may be as described above.

In another embodiment, the present invention provides a method for making a material of formula $Li_xM_{1-z}D_zPO_4$, where M is one or more transition metals comprising the steps of:
  a) forming a mixture comprising a source of the one or more transition metals, a source of phosphorus, a source of lithium, optionally a source of D, and a surfactant, wherein the one or more transition metals, the source of phosphorus, the source of lithium, and the source of D, if present, are dissolved in solution, wherein (i) a ratio of Li:$PO_4$:(M+D) relative to the stoichiometry required to form the material is within the range of 1.04-1.10:1.00-1.05:1, or (ii) a ratio of (Li+$PO_4$):(M+D) relative to the stoichiometry required to form the material is greater than 2.05;
  b) spray drying the mixture from step (a) to form a powder; and
  c) thermally treating the powder from step (b) to form the material.

In this embodiment, M, and D, and x, and z, may be as described above.

The material produced in step (c) may require further densification and/or treating prior to final use. For example, it is known that lithium iron phosphate has poor electrical conductivity. Accordingly, it may be desirable to further treat the material from step (c) to improve its electrical conductivity. In one embodiment, the particles of material from step (c) is (d) mixed with a liquid containing a carbon precursor and (e) that mixture is then spray dried to form particles of lithium metal phosphate coated with the carbon precursor, following which (f) the particles are treated to convert the carbon precursor to carbon.

In some embodiments, step (d) comprises mixing the material from step (c) with a liquid containing a carbon precursor. The liquid containing a carbon precursor may contain a solvent containing a dissolved carbon precursor. In one embodiment, the liquid containing a carbon precursor comprises an aqueous solution containing a dissolved carbon precursor. The dissolved carbon precursor may comprise a sugar. The sugar may comprise sucrose, although other sugars, such as fructose, glucose and lactose, may also be used. In other embodiments, other water-soluble carbon precursors may be used in place of or together with the sugar. Other carbon precursors that may be used in embodiments of the present invention include starch, maltodextrin, gelatine, other sugars including mannose and galactose, and polymers on monomers that are at least partially water-soluble, such as polyacrylate.

In other embodiments, an organic solvent may be used to dissolve a carbon precursor that is soluble in organic solvents, such as a polymer or a monomer, to thereby coat the particles of the material with the carbon precursor. However, use of aqueous solutions containing dissolved carbon precursor is preferred as aqueous solutions have simpler handling and occupational health and safety requirements than organic solutions.

In some embodiments, the material produced in step (c) is milled in the liquid containing the carbon precursor in order to break up any large agglomerates and densify the material, whilst also coating the particles of the material with the carbon precursor. In some embodiments, this milling step takes place by milling a slurry containing from 5 to 50% by weight solids, or from 10 to 30% by weight solids, or from 15 to 25% by weight solids, to reduce the particle size to a $d_{50}$ of from 200 nm to 400 nm, or from 250 to 350 nm.

In embodiments where a sugar solution is used, the sugar solution may comprise from 2% to 10% by weight sugar, or from 3% to 7% by weight sugar, or from 4% to 6% by weight sugar.

Once the particles of the material have been coated with the carbon precursor, it is then spray dried to form agglomerates of the desired shape and particle size. The spray drying step may comprise transferring the slurry from step (d) to a feed tank of a spray dryer. The slurry may be diluted to a solids content of from 5% to 30% by weight, or from 7% to 25% by weight, or from 10% to 20% by weight, in the feed tank of the spray dryer, or in another tank located upstream from the spray dryer.

In some embodiments, the slurry in the feed tank to the spray dryer is spray dried using an air atomised nozzle operating at a pressure of from 2 to 5 Bar, or from 3 to 4 Bar, with an inlet gas temperature in the drying chamber ranging from 150° C. to 500° C., or from 175 to 245° C., or about 190° C., and an outlet temperature from 50 to 150° C., or from 70 to 110° C., or from 80 to 100° C., or about 90° C.

This spray drying step results in the formation of a free-flowing powder comprised of agglomerates of the material coated with the carbon precursor. In embodiments where the carbon precursor comprises a sugar, a free-flowing powder comprised of agglomerates of the material coated with sugar is obtained.

The particles or agglomerates formed in this step may have a mean particle size of less than 10 µm, or from 2.5 µm to less than 10 µm, or from 5 to 8 µm, or from 6 to 7 µm. The particles or agglomerates formed in this step may have a particle size distribution in which $d_{10}$ is from 2 to 4 µm, $d_{50}$ is from 5 to 10 µm and $d_{90}$ is from 10 to 20 µm.

The carbon precursor coating on the agglomerates is then converted to carbon in step (f). The agglomerates may be dried and then heated under a non-reactive or an inert atmosphere, such as under nitrogen or an inert gas atmosphere, to carbonise the carbon precursor. For example, the agglomerates may be placed in a furnace operated at a temperature of from 500° C. to 1000° C., or from 600° C. to 900° C., from 700° to 800° C., or at about 750° C., for a period sufficiently long to carbonise the carbon precursor. In some embodiments, the agglomerates may be held at the elevated temperature for a period of from 30 minutes to 6 hours, from 45 minutes to 5 hours, or from 1 hour to 4 hours, or from 1.5 hours to 3 hours, or for about 2 hours.

Step (f) converts the carbon precursor to carbon and results in the formation of particles of the material having a coating of carbon thereon, or an even coating of carbon thereon. The particles may be packed into sealed bags or containers under a dry atmosphere to avoid moisture absorption, ready for shipping to customers.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

DESCRIPTION OF EMBODIMENTS

Example 1—Production of LFP Using a Solution in Step (a)

The following general procedure was used in these examples:

(1) Preparation of the Precursor Solution Mix

The process used for preparation of the precursor mix is as follows:

Weight out the required mass of raw materials for the batch, including: demineralised water, oxalic acid dihydrate, iron (II) oxalate dihydrate, phosphoric acid, lithium carbonate, hydrogen peroxide and ethoxylated lauryl alcohol surfactant Transfer the demineralised water into a cooling jacketed mixing tank and start the tank stirrer Add the oxalic acid to the mixing tank and continue stirring the mixture which at ambient temperature will form a slurry due to the low solubility of the oxalic acid crystals Add the iron (II) oxalate to the mixing tank while continuing to mix the slurry to keep the solid particles well suspended Start cooling water flow through the mixing tank jacket and commence controlled dosing of the hydrogen peroxide so that the temperature of the mixture, which increases due to an exothermic reaction, does not exceed 70° C.

Upon completion of hydrogen peroxide dosing continue to stir the mixture until all of the iron (II) oxalate has dissolved resulting in a particulate free coffee coloured solution Continue stirring and cooling the solution until the temperature drops to 50° C. or less Continue stirring while adding the phosphoric acid to the mixture, resulting in the colour of solution changing from coffee coloured to green. Stop cooling once the solution temperature is 40° C. or less Continue stirring while dosing the lithium carbonate powder into the solution and monitor the mixture until all lithium carbonate is dissolved Continue stirring while adding and thoroughly dispersing the ethoxylated lauryl alcohol surfactant into the green precursor solution (2) Spray Drying of the Precursor Mix The precursor mix obtained from step (1) is spray dried to yield a yellow precursor powder as follows:

- Transfer the precursor mix to the spray dryer feed tank
- Heat up the spray dryer to obtain stable operation at the required inlet and outlet gas temperatures using demineralised water as the liquid medium
- Switch over the spray dryer feed from demineralised water to precursor mix and fine tune the spray dryer operating conditions to maintain stable operation at the desired temperature setpoints
- Collect the spray dried yellow precursor powder separated from the spray dryer outlet gas stream and store under a dry gas atmosphere to limit moisture absorption (3) Formation of Raw LFP The yellow precursor powder obtained from step (2) is thermally treated in an oxygen free atmosphere to produce a raw LFP intermediate as follows:

- Heat up the thermal reactor to 480° C. and purge the reactor with nitrogen to exclude oxygen
- Transfer the precursor powder into the thermal reactor feed hopper and purge with nitrogen to exclude oxygen
- Start the thermal reactor mixer and transfer the precursor powder from the feed hopper into the reactor
- Heat the precursor powder to 450° C., and then continue heating for a further 45 minutes at 450-480° C. until the powder has been fully converted into raw LFP powder
- Transfer the raw LFP from the thermal reactor into an oxygen free atmosphere until it has cooled to below 60° C. and then store the raw LFP.

(4) Raw LFP Densification, Carbon Coating and Spray Drying

The raw LFP is milled in a sucrose solution to break up spongy agglomerates and densify the LFP while also coating the milled particles with a carbon rich precursor. The milled slurry is then spray dried to form agglomerates of the preferred shape and particle size. The process is as follows:

- Weigh out the required quantity of demineralised water, raw LFP and sucrose
- Transfer the demineralised water to the bead mill feed tank and start the tank mixer
- Add the sucrose to the bead mill feed tank and continue mixing until the sucrose has dissolved
- Start the bead mill and pump that circulates the sucrose solution from the feed tank through the bead mill and establish stable circulation and mill operation
- Commence addition of raw LFP to the feed tank and continue dosing all of the LFP while maintaining stable mill operation, which will result in a slurry containing 20% solids
- Mill the slurry for 60-90 minutes until the particle size is reduced to a D50 of 250-350 nm
- Transfer the milled slurry to the spray dryer feed tank
- Establish stable spray dryer operation at the required inlet and outlet temperature on demineralised water before switching over spray dryer feed to the milled slurry
- Collect the agglomerated sucrose coated LFP separated from the spray dryer outlet gas stream and store for further processing (5) Furnacing of Spray Dried LFP The spray dried LFP agglomerates are furnaced under a nitrogen atmosphere to carbonise the sucrose to form a conductive carbon network as follows:

- Place the spray dried LFP powder in ceramic and/or graphite trays with up to 2.5 kg LFP per tray and position within the central zone of the tube furnace and seal the furnace
- Vacuum dry the LFP by drawing a vacuum of 30-50 mBar in the furnace and heating to 160° C. for 60 minutes
- Upon completion of the drying step re-fill the furnace to atmospheric pressure with dry nitrogen gas and start the heating cycle with a process temperature setpoint of 750° C.
- Continue purging with a small continuous flow of nitrogen gas throughout the heating cycle which comprises a two-hour soak at 750° C. followed by cooling to below 60° C.
- Remove LFP from the furnace and pack into sealed bags/containers under a dry atmosphere to avoid moisture absorption, ready for shipping to customers The above general procedure was used in the following examples:

Example 1A

Lithium iron phosphate (LFP) was prepared at pilot plant scale using the raw material recipe shown below with a total mix mass 204 kg.

| Chemical Inputs | % Component (wt. %) |
| --- | --- |
| Oxalic Acid Dihydrate | 17.20 |
| Demineralised Water | 26.80 |
| Fe (II) Oxalate | 21.74 |
| 50% $H_2O_2$ | 13.03 |
| 85% $H_3PO_4$ | 13.97 |
| Lithium Carbonate | 4.53 |
| Ethoxylated lauryl alcohol Surfactant | 2.73 |

The oxalic acid was added to demineralised water in a stirred tank forming a suspended slurry. The iron (II) oxalate was then added to the stirred slurry. The hydrogen peroxide was dosed at a controlled rate while cooling the jacketed tank so as to maintain the tank contents at 70° C. A mixture of soluble iron (III) oxalate formed as a coffee coloured solution with an excess of the oxalic acid chelating agent present. The mixture was cooled to 50° C. then the phosphoric acid was added changing the solution colour to green. Cooling was stopped once the temperature of the tank contents was 40° C. and the lithium carbonate powder was dosed into the stirred tank and was fully dissolved in about 5 minutes.

The solution was pumped to the spray dryer feed tank where Ethoxylated Lauryl Alcohol surfactant was added and well dispersed by the tank mixer. The solution was spray dried using a disk atomiser and drying chamber inlet gas temperature of 300° C. using a disk atomiser. The addition of ethoxylated lauryl alcohol surfactant resulted in a dry free-flowing yellow powder and high product recovery, in contrast to experiments without ethoxylated lauryl alcohol surfactant which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 45 minutes producing LFP with a crystallite size of about 50 nm and phase purity higher than 99%.

The LFP was mixed with demineralised water to form a slurry with 25% (m/m) solids and sucrose was added at a dosage of 4.2% of the mass of the LFP. The slurry was milled for 110 min in a bead mill equipped with 0.5 mm beads reducing the LFP particle size to a D50 of 350 nm. The slurry was transferred to the spray dryer feed tank where demineralised water was added to reduce the slurry to 13% (m/m) solids. The slurry was spray dried using an air atomised nozzle, operating at 3.2 Bar pressure, a drying chamber inlet gas temperature of 190° C. and an outlet temperature of 90° C. A free flowing powder comprised of sucrose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 700° C. over a period of 60 minutes. The LFP was kept under the nitrogen atmosphere and subjected to a 120 min soak time at 700° C., to convert the sucrose to carbon and sinter the LFP to a crystallite size of about 110 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing confirmed a capacity of 160 mAh/g and rate retention of 75% at a charge/discharge rate of 5 C.

TABLE 1

| Sample | Particle Size Distribution | | | Powder Density | | XRD Characteristics | | | Surface | |
|---|---|---|---|---|---|---|---|---|---|---|
| | PSD $d_{v10}$ (µm) | PSD $d_{v50}$ (µm) | PSD $d_{v90}$ (µm) | Bulk [g/cm3] | Tap [g/cm3] | Crystal. Size (nm) | Strain (%) | Unit Cell ($A^3$) | Area ($m^2/g$) | % C (m/m) |
| Example 1A | 3.96 | 8.37 | 15.8 | 0.822 | 1.370 | 112.8 | 0.03 | 290.81 | 16.23 | 1.52 |

TABLE 2

| | Charge/Discharge Rate (Cycles per Hour) | | | | | | | |
|---|---|---|---|---|---|---|---|---|
| Example 1A | 0.1 C | 0.2 C | 0.5 C | 1 C | 2 C | 3 C | 5 C | 10 C |
| Specific Capacity mAh/g) | 159.5 | 157.2 | 150.7 | 142.7 | 132.6 | 125.5 | 119.4 | 94.1 |
| Rate Retention, % vs 0.1 C | 100.0 | 99.0 | 95.0 | 89.9 | 83.5 | 79.1 | 75.2 | 59.3 |

Example 1B

Lithium iron phosphate (LFP) was prepared at pilot plant scale using the raw material recipe shown below with a total mix mass 201 kg. The ethoxylated lauryl alcohol Surfactant dosage was reduced by half as compared to Example 1.

| Chemical Inputs | % Component (wt. %) |
|---|---|
| Oxalic Acid Dihydrate | 17.44 |
| Demineralised Water | 27.17 |
| Fe (II) Oxalate | 22.04 |
| 50% $H_2O_2$ | 13.03 |
| 85% $H_3PO_4$ | 14.16 |
| Lithium Carbonate | 4.59 |
| Ethoxylated lauryl alcohol Surfactant | 1.37 |

The oxalic acid was added to demineralised water in a stirred tank forming a suspended slurry. The iron (II) oxalate was then added to the stirred slurry. The hydrogen peroxide was dosed at a controlled rate while cooling the jacketed tank so as to maintain the tank contents at 70° C. A mixture of soluble iron (III) oxalate formed as a coffee coloured solution with an excess of the oxalic acid chelating agent present. The mixture was cooled to 50° C. then the phosphoric acid was added changing the solution colour to green. Cooling was stopped once the temperature of the tank contents was 40° C. and the lithium carbonate powder was dosed into the stirred tank and was fully dissolved in about 5 minutes.

The solution was pumped to the spray dryer feed tank where Ethoxylated Lauryl Alcohol surfactant was added at the reduced dosage and well dispersed by the tank mixer. The solution was spray dried using a disk atomiser and drying chamber inlet gas temperature of 300° C. using a disk atomiser. The addition of ethoxylated lauryl alcohol surfactant at half of the Example 1 dosage still provided a dry free-flowing yellow powder and high product recovery, in contrast to experiments without surfactant which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 45 minutes producing LFP with a crystallite size of about 50 nm and phase purity higher than 99%.

The LFP was mixed with demineralised water to form a slurry with 25% (m/m) solids and sucrose was added at an increased dosage of 4.8% of the mass of the LFP (versus 4.2% in Example 1). The slurry was milled for 80 min in a bead mill equipped with 0.5 mm beads reducing the LFP particle size to a D50 of 338 nm. The slurry was transferred to the spray dryer feed tank where demineralised water was added to reduce the slurry to 13% (m/m) solids. The slurry was spray dried using an air atomised nozzle, operating at 4.0 Bar pressure, a drying chamber inlet gas temperature of 188° C. and an outlet temperature of 93° C. A free flowing powder comprised of sucrose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 740° C. over a period of 60 minutes. The LFP was kept under the nitrogen atmosphere and subjected to a 120 min soak time at 740° C., to convert the sucrose to carbon and sinter the LFP to a crystallite size of 96 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing confirmed a capacity of 158 mAh/g and rate retention of 77% at a charge/discharge rate of 5 C.

TABLE 3

| Sample | Particle Size Distribution | | | Powder Density | | XRD Characteristics | | | Unit Cell ($A^3$) | Surface Area ($m^2$/g) | % C (m/m) |
|---|---|---|---|---|---|---|---|---|---|---|---|
| | PSD $d_{v10}$ (µm) | PSD $d_{v50}$ (µm) | PSD $d_{v90}$ (µm) | Bulk [g/cm3] | Tap [g/cm3] | Crystal. Size (nm) | Strain (%) | | | | |
| Example 1B | 2.74 | 5.7 | 10.7 | 0.723 | 1.247 | 95.6 | 0.04 | | 290.83 | 16.70 | 1.40 |

TABLE 4

| | Charge/Discharge Rate (Cycles per Hour) | | | | | | | |
|---|---|---|---|---|---|---|---|---|
| Example 1B | 0.1 C | 0.2 C | 0.5 C | 1 C | 2 C | 3 C | 5 C | 10 C |
| Specific Capacity mAh/g) | 157.8 | 155.1 | 148.7 | 141.8 | 133.4 | 127.6 | 120.5 | 108.0 |
| Rate Retention, % vs 0.1 C | 100.0 | 98.5 | 94.4 | 90.0 | 84.7 | 81.0 | 76.5 | 68.5 |

Example 1C

Lithium iron phosphate (LFP) was prepared at laboratory scale using the raw material recipe shown below with a total mix mass 793 g.

| Chemical Inputs | % Component (wt. %) |
|---|---|
| Oxalic Acid Dihydrate | 11.33 |
| Demineralised Water | 53.78 |
| Fe (II) Oxalate | 14.32 |
| 50% $H_2O_2$ | 8.38 |
| 85% $H_3PO_4$ | 9.20 |
| Lithium Carbonate | 2.98 |
| Ethoxylated lauryl alcohol Surfactant | 3.78 |

The oxalic acid was added to demineralised water in a stirred beaker forming a suspended slurry. The iron (II) oxalate was then added to the stirred slurry. The hydrogen peroxide was dosed at a controlled rate while cooling using a water bath so as to maintain the beaker contents at (or less than) 70° C. A mixture of soluble iron (III) oxalate formed as a coffee coloured solution with an excess of the oxalic acid chelating agent present. The mixture was cooled to 50° C. then the phosphoric acid was added changing the solution colour to green. Cooling was stopped once the temperature of the beaker contents was 40° C. and the lithium carbonate powder was dosed into the stirred beaker and was fully dissolved in about 5 minutes.

The solution was transferred to the spray dryer feed beaker where Ethoxylated Lauryl Alcohol surfactant was added and well dispersed by the magnetic stirrer. The solution was spray dried using an air atomiser nozzle and drying chamber inlet gas temperature of 160° C. using an air atomiser nozzle. The dry free flowing powder was stored under a dry atmosphere to prevent oxidation. The powder was thermally treated in a nitrogen purged tube furnace at a temperature of 450° C. for 1.2 hours producing LFP with a crystallite size of about 45 nm and phase purity higher than 98%.

The LFP was mixed with demineralised water to form a slurry with 20% (m/m) solids and sucrose was added at a dosage of 5% of the mass of the LFP. The slurry was milled for 120 min in a bead mill equipped with 1.0 mm beads reducing the LFP particle size to a D50 of 400 nm. The slurry was transferred to the spray dryer feed beaker where demineralised water was added to reduce the slurry to 10-12% (m/m) solids. The slurry was spray dried using an air atomised nozzle, operating at 6-7 Bar pressure, a drying chamber inlet gas temperature of 160° C. and an outlet temperature of 95° C. A free flowing powder comprised of sucrose coated LFP agglomerates was obtained.

The powder was placed in ceramic crucibles in a laboratory scale tube furnace and dried under vacuum at 150° C. for 60 minutes. After drying the vacuum atmosphere was replaced by nitrogen gas (99.99%) and the furnace temperature was ramped-up to 700° C. The LFP was kept under the nitrogen atmosphere and subjected to a 120 min soak time at 700° C., to convert the sucrose to carbon and sinter the LFP to a crystallite size of about 55 nm. The furnace was allowed to cool over a period of 12 hours to less than 60° C. before the LFP was unloaded from the crucibles and placed in plastic bottles for testing.

The LFP was subjected to physical, chemical and electrochemical characterisation with the results tabulated below. Electrochemical testing confirmed a capacity of >155 mAh/g and rate retention of >75% at a charge/discharge rate of 5 C.

TABLE 5

| Sample | Particle Size Distribution | | | Powder Density | | XRD Characteristics | | | Unit Cell ($A^3$) | Surface Area ($m^2$/g) | % C (m/m) |
|---|---|---|---|---|---|---|---|---|---|---|---|
| | PSD $d_{v10}$ (µm) | PSD $d_{v50}$ (µm) | PSD $d_{v90}$ (µm) | Bulk [g/cm3] | Tap [g/cm3] | Crystal. Size (nm) | Strain (%) | | | | |
| Example 1C | 1.28 | 3.32 | 8.02 | — | — | 56.7 | 0.06 | | 290.9 | 27.37 | 2.1 |

TABLE 6

| Example 1C | Charge/Discharge Rate (Cycles per Hour) | | | | | | | |
|---|---|---|---|---|---|---|---|---|
| | 0.1 C | 0.2 C | 0.5 C | 1 C | 2 C | 3 C | 5 C | 10 C |
| Specific Capacity mAh/g) | 160.3 | 156.3 | 153.1 | 146.4 | 137.9 | 133.9 | 125.6 | 108.7 |
| Rate Retention, % vs 0.1 C | 100.0 | 97.4 | 95.4 | 91.3 | 86.0 | 83.5 | 78.3 | 67.8 |

Example 2—Production of Lithium Iron Phosphate Using a Slurry in Step (a)

The following general procedure was used in these examples:

This process is similar to the process of example 1, except for the precursor mixing stage, which relies on fine milling of the iron precursor in a slurry together with other ingredients prior to spray drying, as opposed to complete dissolution of the iron precursor using oxalic acid and hydrogen peroxide. This change results in a substantial decrease in the chemical input costs as no oxalic acid or hydrogen peroxide is required. The process comprises of the following steps:

(1) Preparation of the Precursor Slurry Mix

The process used for preparation of the precursor slurry is as follows:

- Weight out the required mass of raw materials for the batch, including: demineralised water, iron (II) oxalate dihydrate, phosphoric acid, lithium carbonate and ethoxylated lauryl alcohol surfactant
- Transfer the demineralised water into the bead mill feed tank and start the tank mixer
- Add the phosphoric acid to the bead mill feed tank while continuously mixing
- Dose the lithium carbonate powder into the bead mill feed tank at moderate rate to limit foaming while continuously mixing until the lithium carbonate powder has dissolved
- Start the bead mill and pump that circulates the solution from the feed tank through the bead mill and establish stable circulation and mill operation
- Commence addition of iron (II) oxalate to the feed tank and continue dosing all of the iron (II) oxalate at a rate that allows stable mill operation
- Add demineralised water to the slurry as required to manage the viscosity of the mixture to maintain good mixing flow in the feed tank and stable flow through the mill
- Mill the precursor slurry for 60-90 minutes until the particle size is reduced to a D50 of 700 nm
- Transfer the milled slurry to the spray dryer feed tank and start the tank mixer
- Continue stirring while adding and thoroughly dispersing the ethoxylated lauryl alcohol surfactant into the yellow precursor slurry Steps (2) to (5) are the same as set out in example 1 and need not be repeated.

This general procedure was used in the following examples;

Example 2A

Lithium iron phosphate (LFP) was prepared at pilot plant scale using the raw material recipe shown below with a total mix mass 115 kg. The mix excluded oxalic acid dihydrate and hydrogen peroxide used in the process of examples 1A to 1C.

| Chemical Inputs | % Component (wt. %) |
|---|---|
| Demineralised Water | 44.39 |
| Fe (II) Oxalate | 28.96 |
| 85% $H_3PO_4$ | 18.61 |
| Lithium Carbonate | 6.22 |
| Ethoxylated lauryl alcohol Surfactant | 1.81 |

The demineralised water was weighed out into the bead mill feed tank and the phosphoric acid was added while stirring the solution. The lithium carbonate was dosed into the phosphoric acid solution with continuous stirring, resulting in dissolution of the lithium carbonate and a modest rise in temperature of the mix to 36° C. without any cooling. The bead mill was started and the solution was circulated through the mill while adding the Fe (II) Oxalate to the bead mill feed tank. The sparingly soluble Fe (II) Oxalate formed a suspended slurry, which was milled for 60 min in a bead mill equipped with 0.5 mm beads reducing the particle size to a D50 of 730 nm. As milling progressed demineralised water was added to manage the increase in viscosity to allow effective mixing and milling, resulting in a final milled slurry containing 29% (m/m) solids.

The slurry was pumped to the spray dryer feed tank, where the Ethoxylated Lauryl Alcohol surfactant was added and well dispersed by the tank mixer. Addition of the surfactant further reduced the viscosity of the slurry to a consistency suitable for spray drying. The solution was spray dried using a disk atomiser and drying chamber inlet gas temperature of 306° C. using a disk atomiser. In addition to reducing the viscosity of the slurry to a sprayable consistency, the surfactant resulted in a dry free-flowing yellow powder and high product recovery. This was in contrast to experiments without surfactant which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 60 minutes producing LFP with a crystallite size of about 50 nm and phase purity higher than 98%.

The LFP was mixed with demineralised water to form a slurry with 20% (m/m) solids and sucrose was added at a dosage of 4.5% of the mass of the LFP. The slurry was milled for 120 min in a bead mill equipped with 0.5 mm beads reducing the LFP particle size to a D50 of 331 nm. The slurry was transferred to the spray dryer feed tank where demineralised water was added to reduce the slurry to 13% (m/m) solids.

The slurry was spray dried using an air atomised nozzle, operating at 4.4 Bar pressure, a drying chamber inlet gas temperature of 225° C. and an outlet temperature of 98° C. A free flowing powder comprised of sucrose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 760° C. over a period of 60 minutes. The LFP was kept under the nitrogen atmosphere and subjected to a 120 min soak time at 760° C., to convert the sucrose to carbon and sinter the LFP to a crystallite size of 99 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing confirmed a capacity of 159 mAh/g and rate retention of 76% at a charge/discharge rate of 5 C. Hence equivalent performance was obtained with a reduced quantity of raw materials and hence materials cost as compared to the process of examples 1A to 1C.

TABLE 7

| Sample | Particle Size Distribution | | | Powder Density | | XRD Characteristics | | Unit Cell ($A^3$) | Surface Area ($m^2/g$) | % C (m/m) |
|---|---|---|---|---|---|---|---|---|---|---|
|  | $d_{v10}$ (μm) | $d_{v50}$ (μm) | $d_{v90}$ (μm) | Bulk [g/cm3] | Tap [g/cm3] | Crystal. Size (nm) | Strain (%) | | | |
| Example 2A | 2.36 | 5.19 | 11.4 | 0.896 | 1.401 | 98.7 | 0.04 | 290.87 | 16.75 | 1.30 |

TABLE 8

| | Charge/Discharge Rate (Cycles per Hour) | | | | | | | |
|---|---|---|---|---|---|---|---|---|
| Example 2A | 0.1 C | 0.2 C | 0.5 C | 1 C | 2 C | 3 C | 5 C | 10 C |
| Specific Capacity mAh/g) | 159.3 | 157.5 | 151.2 | 143.8 | 135.1 | 130.0 | 121.4 | 105.6 |
| Rate Retention, % vs 0.1 C | 100.0 | 98.8 | 94.9 | 90.3 | 84.8 | 81.6 | 76.2 | 66.3 |

Example 2B

Lithium iron phosphate (LFP) was prepared at pilot plant scale using the raw material recipe shown below with a total mix mass 115 kg. The mix excluded oxalic acid dihydrate and hydrogen peroxide used in the process of examples 1A to 1C.

| Chemical Inputs | % Component (wt. %) |
|---|---|
| Demineralised Water | 44.39 |
| Fe (II) Oxalate | 28.96 |
| 85% $H_3PO_4$ | 18.61 |
| Lithium Carbonate | 6.22 |
| Ethoxylated lauryl alcohol Surfactant | 1.81 |

The demineralised water was weighed out into the bead mill feed tank and the phosphoric acid was added while stirring the solution. The lithium carbonate was dosed into the phosphoric acid solution with continuous stirring, resulting in dissolution of the lithium carbonate and a modest rise in temperature of the mix to 36° C. without any cooling.

The bead mill was started and the solution was circulated through the mill while adding the Fe (II) Oxalate to the bead mill feed tank. The sparingly soluble Fe (II) Oxalate formed a suspended slurry, which was milled for 60 min in a bead mill equipped with 0.5 mm beads reducing the particle size to a D50 of 730 nm. As milling progressed demineralised water was added to manage the increase in viscosity to allow effective mixing and milling, resulting in a final milled slurry containing 29% (m/m) solids.

The slurry was pumped to the spray dryer feed tank, where the Ethoxylated Lauryl Alcohol surfactant was added and well dispersed by the tank mixer. Addition of the surfactant further reduced the viscosity of the slurry to a consistency suitable for spray drying. The solution was spray dried using a disk atomiser and drying chamber inlet gas temperature of 306° C. using a disk atomiser. In addition to reducing the viscosity of the slurry to a sprayable consistency, the surfactant resulted in a dry free-flowing yellow powder and high product recovery. This was in contrast to experiments without surfactant which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 60 minutes, producing LFP with a crystallite size of about 50 nm and phase purity higher than 98%.

The LFP was mixed with demineralised water to form a slurry with 20% (m/m) solids and glucose was added at a dosage of 4.7% of the mass of the LFP. The slurry was milled for 110 min in a bead mill equipped with 0.5 mm beads reducing the LFP particle size to a D50 of 312 nm. The slurry was transferred to the spray dryer feed tank where demineralised water was added to reduce the slurry to 13% (m/m) solids. The slurry was spray dried using an air atomised nozzle, operating at 4.2 Bar pressure, a drying chamber inlet gas temperature of 222° C. and an outlet temperature of 95° C. A free flowing powder comprised of glucose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 728° C. over a period of 60 minutes. The LFP was kept under the nitrogen atmosphere and subjected to a 120 min soak time at 728° C., to convert the glucose to carbon and sinter the LFP to a crystallite size of 106 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing confirmed a capacity of 160 mAh/g and rate retention of 75% at a charge/discharge rate of 5 C. Hence equivalent performance was obtained to Example 3, where glucose replaced sucrose as the carbon source, and the % C was reduced resulting in higher active material content in the product.

TABLE 9

| Sample | Particle Size Distribution | | | Powder Density | | XRD Characteristics | | | Surface | |
| --- | --- | --- | --- | --- | --- | --- | --- | --- | --- | --- |
| | PSD $d_{v10}$ (µm) | PSD $d_{v50}$ (µm) | PSD $d_{v90}$ (µm) | Bulk [g/cm3] | Tap [g/cm3] | Crystal. Size (nm) | Strain (%) | Unit Cell ($A^3$) | Area ($m^2/g$) | % C (m/m) |
| Example 2B | 2.74 | 6.28 | 13.7 | 0.793 | 1.367 | 105.7 | 0.03 | 290.88 | 12.92 | 1.12 |

TABLE 10

| | Charge/Discharge Rate (Cycles per Hour) | | | | | | | |
| --- | --- | --- | --- | --- | --- | --- | --- | --- |
| Example 2B | 0.1 C | 0.2 C | 0.5 C | 1 C | 2 C | 3 C | 5 C | 10 C |
| Specific Capacity mAh/g) | 159.9 | 159.4 | 153.7 | 146.4 | 136.7 | 129.4 | 119.8 | 100.9 |
| Rate Retention, % vs 0.1 C | 100.0 | 99.7 | 96.1 | 91.6 | 85.5 | 80.9 | 74.9 | 63.1 |

Example 2C

Lithium iron phosphate (LFP) was prepared at laboratory scale using the raw material recipe shown below with a total mix mass 321 g. The mix excluded oxalic acid dihydrate and hydrogen peroxide used in the process of examples 1A to 1C.

| Chemical Inputs | % Component (wt. %) |
| --- | --- |
| Demineralised Water | 70.0 |
| Fe (II) Oxalate | 15.2 |
| 85% $H_3PO_4$ | 9.7 |
| Lithium Carbonate | 3.1 |
| Ethoxylated lauryl alcohol Surfactant | 2.0 |

The demineralised water was weighed out into a beaker and the phosphoric acid was added while stirring the solution. The lithium carbonate was dosed into the phosphoric acid solution with continuous stirring, resulting in dissolution of the lithium carbonate. Fe (II) Oxalate was then added into the above solution resulting into a sparingly soluble Fe (II) Oxalate suspended slurry. The Fe (II) oxalate slurry was bead milled for 150 min in a bead mill equipped with 1.0 mm beads reducing the particle size to a D50 of about 700 nm. A final milled slurry containing 15% (m/m) solids was obtained by adding demineralised water.

The slurry was transferred to the spray dryer feed beaker, where the Ethoxylated Lauryl Alcohol surfactant was added and well dispersed by the magnetic stirrer. The solution was spray dried using an air atomised nozzle and drying chamber inlet gas temperature of 160° C. In addition to reducing the viscosity of the slurry to a sprayable consistency, the surfactant resulted in a dry free-flowing yellow powder and high product recovery. The dry free flowing powder was stored under dry atmosphere to prevent oxidation. The powder was thermally treated in a nitrogen purged laboratory tube furnace at a temperature of 450° C. for 60 minutes producing LFP with a crystallite size of about 45 nm and phase purity higher than 98%.

The LFP was mixed with demineralised water to form a slurry with 20% (m/m) solids and sucrose was added at a dosage of 5.0% of the mass of the LFP. The slurry was milled for 120 min in a bead mill equipped with 1.0 mm beads reducing the LFP particle size to a D50 of 400 nm. The slurry was transferred to the spray dryer feed beaker where demineralised water was added to reduce the slurry to 10% (m/m) solids. The slurry was spray dried using an air atomised nozzle, operating at 6-7 Bar pressure, a drying chamber inlet gas temperature of 160° C. and an outlet temperature of 95° C. A free flowing powder comprised of sucrose coated LFP agglomerates was obtained.

The powder was placed in alumina crucibles in a laboratory scale tube furnace and dried under vacuum at 150° C. for 60 minutes. After drying the vacuum atmosphere was replaced by nitrogen gas (99.99%) and the furnace temperature was ramped-up to 700° C. over a period of 60 minutes. The LFP was kept under the nitrogen atmosphere and subjected to a 120 min soak time at 700° C., to convert the sucrose to carbon and sinter the LFP to a crystallite size of 50 nm. The furnace was allowed to cool over a period of 12 hours to less than 60° C. before the LFP was unloaded from the crucibles and packed into a sealed bottle for testing.

The LFP was subjected to physical, chemical and electrochemical characterisation with the results tabulated below. Electrochemical testing confirmed a capacity of >155 mAh/g and rate retention of >75% at a charge/discharge rate of 5 C. Hence equivalent performance was obtained with a reduced quantity of raw materials and hence materials cost as compared to the process used in examples 1A to 1C.

TABLE 11

| Sample | Particle Size Distribution | | | Powder Density | | XRD Characteristics | | | Surface | |
| --- | --- | --- | --- | --- | --- | --- | --- | --- | --- | --- |
| | PSD $d_{v10}$ (µm) | PSD $d_{v50}$ (µm) | PSD $d_{v90}$ (µm) | Bulk [g/cm3] | Tap [g/cm3] | Crystal. Size (nm) | Strain (%) | Unit Cell ($A^3$) | Area ($m^2/g$) | % C (m/m) |
| Example 2C | 1.94 | 5.19 | 11.0 | — | — | 51.9 | 0.09 | 290.8 | — | 1.6 |

TABLE 12

| | Charge/Discharge Rate (Cycles per Hour) | | | | | | | |
|---|---|---|---|---|---|---|---|---|
| Example 2C | 0.1 C | 0.2 C | 0.5 C | 1 C | 2 C | 3 C | 5 C | 10 C |
| Specific Capacity mAh/g) | 157.8 | 156.1 | 152.1 | 147.1 | 139.4 | 133.0 | 122.6 | 103.9 |
| Rate Retention, % vs 0.1 C | 100.0 | 98.9 | 96.3 | 93.1 | 88.3 | 84.3 | 77.7 | 65.8 |

Example 2D

Lithium iron phosphate (LFP) was prepared at pilot plant scale using the raw material recipe shown below with a total mix mass 115 kg. The mix excluded oxalic acid dihydrate and hydrogen peroxide used in the process of examples 1A to 1C. It had an increased ratio of $H_3PO_4$ and Lithium Carbonate to Fe (II) Oxalate as compared to pilot plant Examples 2A and 2B, resulting in LFP with a more graded stoichiometry.

| Chemical Inputs | % Component (wt. %) |
|---|---|
| Demineralised Water | 44.26 |
| Fe (II) Oxalate | 28.88 |
| 85% $H_3PO_4$ | 18.83 |
| Lithium Carbonate | 6.22 |
| LA9 Surfactant | 1.81 |

The demineralised water was weighed out into the bead mill feed tank and the phosphoric acid was added while stirring the solution. The lithium carbonate was dosed into the phosphoric acid solution with continuous stirring, resulting in dissolution of the lithium carbonate and a modest rise in temperature of the mix.

The bead mill was started and the solution was circulated through the mill while adding the Fe (II) Oxalate to the bead mill feed tank. The sparingly soluble Fe (II) Oxalate formed a suspended slurry, which was milled for 85 min in a bead mill equipped with 0.5 mm beads reducing the particle size to a D50 of 712 nm. As milling progressed demineralised water was added to manage the increase in viscosity to allow effective mixing and milling, resulting in a final milled slurry containing 33% (m/m) solids.

The slurry was pumped to the spray dryer feed tank, where the LA9 (Ethoxylated Lauryl Alcohol) surfactant was added and well dispersed by the tank mixer. Addition of the LA9 further reduced the viscosity of the slurry to a consistency suitable for spray drying. The solution was spray dried using a disk atomiser and drying chamber inlet gas temperature of 300° C. using a disk atomiser. In addition to reducing the viscosity of the slurry to a sprayable consistency, the LA9 resulted in a dry free-flowing yellow powder and high product recovery. This was in contrast to experiments without LA9 which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 75 minutes, producing LFP with a crystallite size of about 50 nm and phase purity higher than 98%.

The LFP was mixed with demineralised water to form a slurry with 20% (m/m) solids and sucrose was added at a dosage of 5.1% of the mass of the LFP. The slurry was milled for 75 min in a bead mill equipped with 0.5 mm beads reducing the LFP particle size to a D50 of 281 nm. The slurry was transferred to the spray dryer feed tank where demineralised water was added to reduce the slurry to 13% (m/m) solids. The slurry was spray dried using an air atomised nozzle, operating at 3.8 Bar pressure, a drying chamber inlet gas temperature of 186° C. and an outlet temperature of 94° C. A free flowing powder comprised of sucrose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 760° C. over a period of 60 minutes. The LFP was kept under the nitrogen atmosphere and subjected to a 120 min soak time at 760° C., to convert the sucrose to carbon and sinter the LFP to a crystallite size of 131 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing indicated a specific capacity at 0.1 C of 160.8 mAh/g and rate retention of 69% at a charge/discharge rate of 5 C. Hence improved specific capacity was obtained relative to Examples 2A to 2B which had less graded stoichiometry.

TABLE 13

| | Particle Size Distribution | | | XRD Characteristics | | | | | |
|---|---|---|---|---|---|---|---|---|---|
| | PSD | PSD | PSD | Powder Density | | Crystal. | | Unit | Surface | |
| Sample | $d_{v10}$ (μm) | $d_{v50}$ (μm) | $d_{v90}$ (μm) | Bulk [g/cm3] | Tap [g/cm3] | Size (nm) | Strain (%) | Cell ($A^3$) | Area ($m^2$/g) | % C (m/m) |
| Example 2D | 2.92 | 6.48 | 13.8 | 1.143 | 1.725 | 131.1 | 0.03 | 290.88 | 15.20 | 1.48 |

TABLE 14

| | Charge/Discharge Rate (Cycles per Hour) | | | | | | | |
|---|---|---|---|---|---|---|---|---|
| Example 2D | 0.1 C | 0.2 C | 0.5 C | 1 C | 2 C | 3 C | 5 C | 10 C |
| Specific Capacity mAh/g) | 160.8 | 158.9 | 152.6 | 143.2 | 130.1 | 124.7 | 110.8 | 87.9 |

TABLE 14-continued

| | Charge/Discharge Rate (Cycles per Hour) | | | | | | | |
|---|---|---|---|---|---|---|---|---|
| Example 2D | 0.1 C | 0.2 C | 0.5 C | 1 C | 2 C | 3 C | 5 C | 10 C |
| Rate Retention, % vs 0.1 C | 100.0 | 98.8 | 94.5 | 89.1 | 80.9 | 77.5 | 69.0 | 54.7 |

Example 2E

Lithium iron phosphate (LFP) was prepared at pilot plant scale using the raw material recipe shown below, which is the same recipe used for Example 2D, with a total mix mass 115 kg. The mix excluded oxalic acid dihydrate and hydrogen peroxide used in the process of examples 1A to 1C. It had an increased ratio of $H_3PO_4$ and Lithium Carbonate to Fe (II) Oxalate as compared to pilot plant Examples 2A and 2B, resulting in LFP with a more graded stoichiometry.

| Chemical Inputs | % Component (wt. %) |
|---|---|
| Demineralised Water | 44.26 |
| Fe (II) Oxalate | 28.88 |
| 85% $H_3PO_4$ | 18.83 |
| Lithium Carbonate | 6.22 |
| LA9 Surfactant | 1.81 |

The demineralised water was weighed out into the bead mill feed tank and the phosphoric acid was added while stirring the solution. The lithium carbonate was dosed into the phosphoric acid solution with continuous stirring, resulting in dissolution of the lithium carbonate and a modest rise in temperature of the mix.

The bead mill was started and the solution was circulated through the mill while adding the Fe (II) Oxalate to the bead mill feed tank. The sparingly soluble Fe (II) Oxalate formed a suspended slurry, which was milled for 90 min in a bead mill equipped with 0.5 mm beads reducing the particle size to a D50 of 716 nm. As milling progressed demineralised water was added to manage the increase in viscosity to allow effective mixing and milling, resulting in a final milled slurry containing 30% (m/m) solids.

The slurry was pumped to the spray dryer feed tank, where the LA9 (Ethoxylated Lauryl Alcohol) surfactant was added and well dispersed by the tank mixer. Addition of the LA9 further reduced the viscosity of the slurry to a consistency suitable for spray drying. The solution was spray dried using a disk atomiser and drying chamber inlet gas temperature of 302° C. using a disk atomiser. In addition to reducing the viscosity of the slurry to a sprayable consistency, the LA9 resulted in a dry free-flowing yellow powder and high product recovery. This was in contrast to experiments without LA9 which produced a moist powder with about two thirds of the product lost due to accumulation of the sticky powder in the drying chamber. The dry free flowing powder was stored under a nitrogen atmosphere to prevent oxidation. The powder was thermally treated in a nitrogen purged and mechanically fluidised reactor at a temperature of 450° C. for 75 minutes, producing LFP with a crystallite size of about 50 nm and phase purity higher than 98%.

The LFP was mixed with demineralised water to form a slurry with 18% (m/m) solids and sucrose was added at a dosage of 5.1% of the mass of the LFP. The slurry was milled for 80 min in a bead mill equipped with 0.5 mm beads reducing the LFP particle size to a D50 of 227 nm. The slurry was transferred to the spray dryer feed tank where demineralised water was added to reduce the slurry to 12% (m/m) solids. The slurry was spray dried using an air atomised nozzle, operating at 3.0 Bar pressure, a drying chamber inlet gas temperature of 199° C. and an outlet temperature of 95° C. A free flowing powder comprised of sucrose coated LFP agglomerates was obtained.

The powder was placed in graphite crucibles in a pilot scale tube furnace and dried under vacuum at 160° C. for 60 minutes. After drying the vacuum atmosphere was replaced by nitrogen gas (99.99%) and the furnace temperature was ramped-up to 727° C. over a period of 60 minutes. The LFP was kept under the nitrogen atmosphere and subjected to a 120 min soak time at 727° C., to convert the sucrose to carbon and sinter the LFP to a crystallite size of 122 nm. The furnace was allowed to cool over a period of 12 hours to less than 60° C. before the LFP was unloaded from the trays and packed into sealed foil bags under a dry atmosphere.

The LFP was subjected to physical, chemical and electrochemical characterisation with the results tabulated below. Physical and chemical properties were found to provide satisfactory electrode making properties and electrochemical testing indicated a specific capacity at 0.1 C of 161.6 mAh/g and rate retention of 76% at a charge/discharge rate of 5 C. Hence improved specific capacity was obtained relative to Examples 2A to 2B which had less graded stoichiometry.

TABLE 15

| | Particle Size Distribution | | | Powder Density | | XRD Characteristics | | | |
|---|---|---|---|---|---|---|---|---|---|
| Sample | PSD $d_{v10}$ (μm) | PSD $d_{v50}$ (μm) | PSD $d_{v90}$ (μm) | Bulk [g/cm3] | Tap [g/cm3] | Crystal. Size (nm) | Strain (%) | Unit Cell ($A^3$) | Surface Area ($m^2/g$) | % C (m/m) |
| Example 2E | 2.83 | 6.77 | 16.2 | 1.175 | 1.652 | 121.9 | 0.03 | 290.91 | 15.40 | 1.46 |

TABLE 16

| | Charge/Discharge Rate (Cycles per Hour) | | | | | | | |
|---|---|---|---|---|---|---|---|---|
| Example 2E | 0.1 C | 0.2 C | 0.5 C | 1 C | 2 C | 3 C | 5 C | 10 C |
| Specific Capacity mAh/g) | 161.6 | 160.3 | 155.4 | 148.2 | 136.8 | 131.6 | 122.8 | 102.7 |
| Rate Retention, % vs 0.1 C | 100.0 | 99.2 | 96.2 | 91.7 | 84.6 | 81.4 | 76.0 | 63.6 |

Example 3A Provides an Example of Low Mn (30%) with Increased Energy Density Vs LFP Lithium manganese iron phosphate (LMFP) was prepared at laboratory scale using the raw material recipe shown below to provide a nominal Mn:Fe ratio of 0.3:0.7 and a total mix mass 465 g. The mix excluded oxalic acid dihydrate and hydrogen peroxide used in the process of examples 1A to 1C.

| Chemical Inputs | % Component (wt %) |
| --- | --- |
| Demineralised Water | 64.5 |
| Fe (II) Oxalate | 12.9 |
| Mn (II) Oxalate | 5.5 |
| 85% $H_3PO_4$ | 12.1 |
| Lithium Carbonate | 4.0 |
| LA9 Surfactant | 1.0 |

The demineralised water was weighed out into a beaker and the phosphoric acid was added while stirring the solution. The lithium carbonate was dosed into the phosphoric acid solution with continuous stirring, resulting in dissolution of the lithium carbonate. Fe (II) Oxalate and Mn (II) Oxalate were then added into the above solution resulting into a sparingly soluble Fe (II) Oxalate and Mn (II) Oxalate suspended slurry. The slurry was bead milled for 150 min in a bead mill equipped with 1.0 mm beads reducing the particle size to a D50 of about 700 nm. A final milled slurry containing 15% (m/m) solids was obtained by adding demineralised water.

The slurry was transferred to the spray dryer feed beaker, where the LA9 (Ethoxylated Lauryl Alcohol) surfactant was added and well dispersed by the magnetic stirrer. The solution was spray dried using an air atomised nozzle and drying chamber inlet gas temperature of 165° C. In addition to reducing the viscosity of the slurry to a sprayable consistency, the LA9 resulted in a dry free-flowing yellow powder and high product recovery. The dry free flowing powder was stored under dry atmosphere to prevent oxidation. The powder was thermally treated in a nitrogen purged laboratory tube furnace at a temperature of 450° C. for 60 minutes producing LMFP with a crystallite size of about 50 nm and phase purity higher than 98%.

The LMFP was mixed with demineralised water to form a slurry with 20% (m/m) solids and sucrose was added at a dosage of 6.0% of the mass of the LMFP. The slurry was milled for 150 min in a bead mill equipped with 1.0 mm beads reducing the LMFP particle size to a D50 of 400 nm. The slurry was transferred to the spray dryer feed beaker where demineralised water was added to reduce the slurry to 10% (m/m) solids. The slurry was spray dried using an air atomised nozzle, operating at 6-7 Bar pressure, a drying chamber inlet gas temperature of 165° C. and an outlet temperature of 95° C. A free flowing powder comprised of sucrose coated LMFP agglomerates was obtained.

The powder was placed in alumina crucibles in a laboratory scale tube furnace and dried under vacuum at 150° C. for 60 minutes. After drying the vacuum atmosphere was replaced by nitrogen gas (99.99%) and the furnace temperature was ramped-up to 700° C. over a period of 90 minutes. The LMFP was kept under the nitrogen atmosphere and subjected to a 120 min soak time at 700° C., to convert the sucrose to carbon and sinter the LMFP to a crystallite size of 55 nm. The furnace was allowed to cool over a period of 12 hours to less than 60° C. before the LMFP was unloaded from the crucibles and packed into a sealed bottle for testing.

The LMFP was subjected to physical, chemical and electrochemical characterisation with the results tabulated below. Electrochemical testing confirmed a capacity of >158 mAh/g and rate retention of >75% at a charge/discharge rate of 5 C. Due to the higher battery voltage provided by Mn relative to Fe, the similar specific capacity obtained for LMFP relative to LFP of prior examples, resulted in an increase in the energy density of batteries made with the LMFP. Hence increased energy density was obtained for LMFP produced by substituting some of the iron in LFP by manganese, as compared to the energy density for LFP of Examples 1A to 1C and 2A to 2D, which did not include manganese.

TABLE 17

| Sample | Particle Size Distribution | | | Powder Density | | XRD Characteristics | | | Surface Area ($m^2/g$) | % C (m/m) |
| --- | --- | --- | --- | --- | --- | --- | --- | --- | --- | --- |
| | $d_{v10}$ (μm) | $d_{v50}$ (μm) | $d_{v90}$ (μm) | Bulk [g/cm3] | Tap [g/cm3] | Crystal. Size (nm) | Strain (%) | Unit Cell ($A^3$) | | |
| Example 3A | 1.37 | 3.03 | 6.29 | — | — | 56.3 | 0.191 | 293.2 | 28.6 | 1.8 |

TABLE 18

| | Charge/Discharge Rate (Cycles per Hour) | | | | | | | |
| --- | --- | --- | --- | --- | --- | --- | --- | --- |
| Example 3A | 0.1 C | 0.2 C | 0.5 C | 1 C | 2 C | 3 C | 5 C | 10 C |
| Specific Capacity mAh/g) | 158.9 | 156.8 | 153.8 | 150.4 | 145.8 | 142.6 | 135.9 | 99.3 |
| Rate Retention, % vs 0.1 C | 100 | 98.6 | 96.8 | 94.6 | 91.7 | 89.7 | 85.5 | 62.5 |

Example 3B Provides an Example of High Mn (60%) with Increased Energy Density Vs LFP Lithium manganese iron phosphate (LMFP) was prepared at laboratory scale using the raw material recipe shown below to provide a nominal Mn:Fe ratio of 0.6:0.4 with a total mix mass 465 g. The mix excluded oxalic acid dihydrate and hydrogen peroxide used in the process of examples 1A to 1C.

| Chemical Inputs | % Component (wt %) |
| --- | --- |
| Demineralised Water | 64.5 |
| Fe (II) Oxalate | 7.3 |
| Mn (II) Oxalate | 11.0 |

-continued

| Chemical Inputs | % Component (wt %) |
|---|---|
| 85% $H_3PO_4$ | 12.1 |
| Lithium Carbonate | 4.0 |
| LA9 Surfactant | 1.0 |

The demineralised water was weighed out into a beaker and the phosphoric acid was added while stirring the solution. The lithium carbonate was dosed into the phosphoric acid solution with continuous stirring, resulting in dissolution of the lithium carbonate. Fe (II) Oxalate and Mn (II) Oxalate were then added into the above solution resulting into a sparingly soluble Fe (II) Oxalate and Mn (II) Oxalate suspended slurry. The slurry was bead milled for 150 min in a bead mill equipped with 1.0 mm beads reducing the particle size to a D50 of about 700 nm. A final milled slurry containing 15% (m/m) solids was obtained by adding demineralised water.

The slurry was transferred to the spray dryer feed beaker, where the LA9 (Ethoxylated Lauryl Alcohol) surfactant was added and well dispersed by the magnetic stirrer. The solution was spray dried using an air atomised nozzle and drying chamber inlet gas temperature of 165° C. In addition to reducing the viscosity of the slurry to a sprayable consistency, the LA9 resulted in a dry free-flowing yellow powder and high product recovery. The dry free flowing powder was stored under dry atmosphere to prevent oxidation. The powder was thermally treated in a nitrogen purged laboratory tube furnace at a temperature of 450° C. for 60 minutes producing LMFP with a crystallite size of about 50 nm and phase purity higher than 98%.

The LMFP was mixed with demineralised water to form a slurry with 20% (m/m) solids and sucrose was added at a dosage of 6.0% of the mass of the LMFP. The slurry was milled for 150 min in a bead mill equipped with 1.0 mm beads reducing the LMFP particle size to a D50 of 400 nm. The slurry was transferred to the spray dryer feed beaker where demineralised water was added to reduce the slurry to 10% (m/m) solids. The slurry was spray dried using an air atomised nozzle, operating at 6-7 Bar pressure, a drying chamber inlet gas temperature of 165° C. and an outlet temperature of 95° C. A free flowing powder comprised of sucrose coated LMFP agglomerates was obtained.

The powder was placed in alumina crucibles in a laboratory scale tube furnace and dried under vacuum at 150° C. for 60 minutes. After drying the vacuum atmosphere was replaced by nitrogen gas (99.99%) and the furnace temperature was ramped-up to 700° C. over a period of 90 minutes. The LMFP was kept under the nitrogen atmosphere and subjected to a 120 min soak time at 700° C., to convert the sucrose to carbon and sinter the LMFP to a crystallite size of 50 nm. The furnace was allowed to cool over a period of 12 hours to less than 60° C. before the LMFP was unloaded from the crucibles and packed into a sealed bottle for testing.

The LMFP was subjected to physical, chemical and electrochemical characterisation with the results tabulated below. Electrochemical testing confirmed a capacity of >155 mAh/g and rate retention of >75% at a charge/discharge rate of 5 C. Due to the higher battery voltage provided by Mn relative to Fe, the similar specific capacity obtained for LMFP relative to LFP of prior examples, resulted in an increase in the energy density of batteries made with the LMFP. Hence increased energy density was obtained for LMFP produced by substituting some of the iron in LFP by manganese, as compared to the energy density for LFP of Examples 1A to 1C and 2A to 2D, which did not include manganese.

TABLE 19

| Sample | Particle Size Distribution | | | Powder Density | | Crystal. | | XRD Characteristics | | |
|---|---|---|---|---|---|---|---|---|---|---|
| | $d_{v10}$ (μm) | $d_{v50}$ (μm) | $d_{v90}$ (μm) | Bulk [g/cm3] | Tap [g/cm3] | Size (nm) | Strain (%) | Unit Cell ($A^3$) | Surface Area ($m^2/g$) | % C (m/m) |
| Example 3B | 1.47 | 3.23 | 6.47 | — | — | 53.7 | 0.159 | 296.6 | 26.1 | 1.8 |

TABLE 20

| | Charge/Discharge Rate (Cycles per Hour) | | | | | | | |
|---|---|---|---|---|---|---|---|---|
| Example 3B | 0.1 C | 0.2 C | 0.5 C | 1 C | 2 C | 3 C | 5 C | 10 C |
| Specific Capacity mAh/g) | 156.7 | 155.0 | 152.3 | 149.3 | 145.0 | 141.3 | 133.2 | 115.0 |
| Rate Retention, % vs 0.1 C | 100 | 98.9 | 97.1 | 95.2 | 92.5 | 90.1 | 85.0 | 73.3 |

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for making a material of formula $Li_xM_{1-z}D_zPO_4$, where M is one or more transition metals, D represents one or more elements selected from the group consisting of Mg, Ca, Sr, Ba, Ti, Zn, B, Al, Ga, In, Si, Ge, Sc, Y, Pr, Eu, Tm, Er, Dy, Ce, Nd, Yb, Gd, Pm, Tb, La, Sm, Lu, and Ho, $0.8 \leq x \leq 1.2$ and $0 \leq z \leq 0.2$, the method comprising the steps of:
   a) forming a mixture comprising a liquid, a source of the one or more transition metals, a source of phosphorus, a source of lithium and a surfactant, and optionally a source of D, wherein the mixture formed in step (a) comprises a slurry in which one or more of the source of one or more transition metals, the source of phosphorus, the source of lithium, or the source of D if present, is present as particulate material, and wherein:
      (i) a ratio of Li:$PO_4$:(M+D) relative to the stoichiometry required to form the material is within the range of 1.04-1.10:1.01-1.05:1, or
      (ii) a ratio of (Li+$PO_4$):(M+D) relative to the stoichiometry required to form the material is greater than 2.05;
      wherein ratios of Li:$PO_4$:(M+D) are such that Li>$PO_4$>(M+D);
   b) drying the mixture from step (a) to form particles or a powder; and
   c) thermally treating the particles or powder from step (b) to form the material;
   d) mixing the material from step (c) with a liquid containing a carbon precursor,
   e) spray drying the mixture from step (d) to form particles of the material coated with the carbon precursor, and
   f) converting the carbon precursor to carbon.

2. A method as claimed in claim 1, wherein M is one or more transition metals selected from Fe, Mn, Ni, Co, Cr or V, or M is Fe, or M comprises Fe and one or more of Mn, Ni, Co, Cr or V, or M comprises two or more of Fe, Mn, Ni, Co, Cr or V.

3. A method as claimed in claim 1, wherein the source of one or more transition metals is present as particulate material.

4. A method as claimed in claim 1, wherein the particulate material or the slurry is milled prior to drying.

5. A method as claimed in claim 1, wherein the source of one or more transition metals comprises a source of iron or an iron containing compound.

6. A method as claimed in claim 1, wherein the source of D comprises one or more water soluble compounds containing D or one or more water insoluble compounds containing D, or mixtures thereof.

7. A method wherein the ratio of (Li+$PO_4$):(M+D) relative to the stoichiometry required to form the material of claim 1 is in the range of from 2.07-2.13.

8. A method as claimed in claim 1, wherein step (b) comprises spray drying.

9. A method as claimed in claim 8 wherein step (b) is conducted using a spray dryer and an inlet gas temperature to the dryer has a temperature of from 150° C. to 500° C. and a dryer outlet gas has a temperature of from 50° C. to 150° C.

10. A method as claimed in claim 1, wherein a powder produced in step (b) is a precursor powder or precursor particulate material and the precursor powder or precursor particulate material is thermally treated to produce particles of the material.

11. A method as claimed in claim 10, wherein the thermal treatment of step (c) is conducted in an oxygen free atmosphere, or in a nitrogen atmosphere or in an inert atmosphere.

12. A method as claimed in claim 1, wherein step (c) comprises passing the powder/particulate material from step (b) into an environment having a temperature of from 400 to 600° C. for a period of from 5 minutes to 6 hours.

13. A method as claimed in claim 3, wherein the liquid containing a carbon precursor contains a solvent containing a dissolved carbon precursor, or the liquid containing a carbon precursor comprises an aqueous solution containing a dissolved carbon precursor.

14. A method as claimed in claim 1, wherein the material produced in step (c) is milled in the liquid containing the carbon precursor in order to break up any large agglomerates and densify the material, whilst also coating the particles of the material with the carbon precursor.

15. A method as claimed in claim 1, wherein once the particles of the material have been coated with the carbon precursor, it is then spray dried to form agglomerates having a mean particle size of less than 10 μm and the particles or agglomerates formed in this step have a particle size distribution in which d10 is from 2 to 4 μm, d50 is from 5 to 10 μm and d90 is from 10 to 20 μm.

16. A method as claimed in claim 1, wherein the carbon precursor coating on the agglomerates is then converted to carbon in step (f) by drying and then heating under a non-reactive or an inert atmosphere to carbonise the carbon precursor.

17. A method as claimed claim 1, wherein:
   the source of phosphorus comprises a phosphorus containing compound or a phosphorus containing acid, or phosphoric acid, or lithium containing phosphates, or organic phosphates or other phosphate containing compounds; and/or
   the source of lithium comprises one or more of lithium-containing carbonates, lithium-containing phosphates, lithium-containing hydroxides, mineral lithium salts, organic mineral salts containing lithium, or metallic lithium or other lithium containing compounds.

18. A method as claimed in claim 1, wherein:
   the surfactant is present in an amount of from 0.05% to 10% by weight of the mixture; and/or
   the source of one or more transition metals comprises from 5% to 40% by weight of the mixture; and/or
   the source of phosphorus is present in an amount of from 5% to 30% by weight of the mixture; and/or
   the source of lithium is present in an amount of from 2% to 21% by weight of the mixture.

19. A method as claimed in claim 1, wherein the material formed in step (c) comprises particles that are formed as agglomerates of crystallites and the crystallites have a particle size in the range from 10 to 200 nm; and/or
   the material formed in step (c) comprises particles that are formed as agglomerates of crystallites having a particle size distribution having d10 of from 1-10 μm, d50 of from 5-50 μm and d90 of from 10-100 μm.

* * * * *